United States Patent [19]

Bernhard et al.

[11] 4,076,551
[45] Feb. 28, 1978

[54] CARBON BLACK-CONTAINING PIGMENTS AND PROCESS FOR THEIR PREPARATION

[75] Inventors: Horst Bernhard; Reiner Esselborn, Darmstadt, Germany

[73] Assignee: Merck Patent Gesellschaft mit beschrankter Haftung, Darmstadt, Germany

[21] Appl. No.: 749,245

[22] Filed: Dec. 10, 1976

[30] Foreign Application Priority Data

Dec. 22, 1975 Germany .............................. 2557796

[51] Int. Cl.$^2$ ................................................ C09C 1/00
[52] U.S. Cl. .................................... 106/291; 106/307; 106/300; 106/308 B; 106/DIG. 3; 427/218; 428/363; 428/403
[58] Field of Search ................. 106/291, 307, 308 B, 106/300, DIG. 3; 428/363, 403; 427/218

[56] References Cited

U.S. PATENT DOCUMENTS 3,087,827   4/1963   Klenke et al. ...................... 106/291
3,107,173   10/1963   Klenke ............................. 106/291

FOREIGN PATENT DOCUMENTS 1,165,182   6/1962   Germany ........................... 106/291

Primary Examiner—Winston A. Douglas
Assistant Examiner—J. V. Howard
Attorney, Agent, or Firm—Millen & White

[57] ABSTRACT

A process for the preparation of carbon black-containing pigments consists essentially of precipitation of a carbon black-containing metal hydroxide or bismuth oxychloride layer on substrate particles in an aqueous suspension containing carbon black particles of particle size of below 1 mn. and washing, drying and optionally calcining the products. Flaky substrates, e.g., mica flakes coated with TiO$_2$, are preferably employed. Carbon black-containing pigments obtained have carbon black particles incorporated in a metal hydroxide, metal oxide or bismuth oxychloride layer precipitated on the substrate in the presence of the carbon black.

14 Claims, No Drawings

CARBON BLACK-CONTAINING PIGMENTS AND PROCESS FOR THEIR PREPARATION

BACKGROUND OF THE INVENTION

It is known that special color effects can be achieved by incorporation of carbon black into pigments. However, incorporation of carbon black into masses being pigmented is difficult, since the carbon black must be in finely dispersed form. Adsorption of carbon black on freshly precipitated iron hydroxide has been attempted and described in British Patent Specification No. 1,178,050. Incorporation of carbon black into flaky pigments has been described, e.g., in published German Patent Specification No. 1,165,182, as a way of obtaining particularly attractive color effects in lustrous pigments.

Known processes in which carbon black is produced by pyrolysis of organic compounds have several disadvantages:

(a) high capital outlay for apparatus, since the pigment being coated with carbon black is heated, for example, with hydrocarbons at temperatures between 700° and 1000° C.

(b) the operation requires exclusion of oxygen, which is technically difficult.

(c) upon heating above 700° C., interference colors of lustrous pigments change, depending on the period of calcination and temperature.

(d) pigments thus-produced contain free carbon black which, when the pigment is suspended, separates and becomes disturbingly noticeable.

(e) according to German Patent Specification No. 1,165,182, only pigments are formed in which carbon black is on the surface and fills in intermediate spaces between $TiO_2$ grains in a layer thereof on the mica.

Thus, there is a need for methods of preparing stable, commercially useful, easily handled, carbon black-containing pigments, and for providing lustrous pigments which, because of their carbon black content, have special color effects.

This problem is solved by a new process for fixing carbon black particles on any desired substrate.

SUMMARY OF THE INVENTION

In a compositional aspect, this invention relates in a pigment comprising carbon black and a coated substrate, to the improvement wherein the pigment comprises a layer on the substrate of metal hydroxide or oxide or of bismuth oxychloride containing carbon black particles embedded therein.

In a method aspect, this invention relates to a method for the preparation of a pigment having carbon black particles embedded in a precipitated layer on a substrate, comprising the step of:

(a) precipitating an insoluble metal hydroxide or oxide or bismuth oxychloride in an aqueous suspension of a particulate substrate and carbon black of particle size below 1 mn., thereby forming a coating on the substrate.

DETAILED DESCRIPTION

In the process of the invention, carbon black is employed in finely divided form. A carbon black dispersion is first prepared, in which the particle size of individual particles is preferably not in excess of 1 mn. (1 · $10^{-6}$m.). Very small particles are preferred, e.g., those with an average particle size between 0.001 to 1 mn.

Commercially available types of carbon black, some of which are offered in paste form, can be used as starting materials. In many cases, it is advantageous, for better dispersion, to add wetting agents, e.g., non-ionic or ionic, commercially available types. For example, polyethylene and polypropylene glycols are appropriate. There can, however, be used other wetting agents, e.g. those mentioned in Kirk-Othmer's Encyclopedia of Chemical Technology, Second Edition, Volume 19, Pages 507 - 593, under the catchword "Surfactants".

Neither the type nor the amount of the added wetting agent is critical but, in general, the amount of wetting agent is at most 2% by weight, with respect to dispersion liquid. Wetting agents are already present, and sometimes hydrophilic solvents, for example, alcohols, in some of the commercially available carbon black pastes.

The amount of carbon black employed is between 1 and 200 mg./g. of substrate, preferably between 5 and 100 mg./g. However, for special effects, larger or smaller amounts can be used.

The carbon black dispersion can either be added to the substrate suspension before precipitation or can be added jointly with the metal salt solution or separately during precipitation.

A substrate with a higher specific surface area can take up more carbon black than one with lower specific surface area. For example, about 15 mg. carbon black/$m^2$. can be fixed on the available surface area of mica flakes coated with $TiO_2$. Pigments thereby obtained have a carbon black content between 0.1 and about 10% by weight. If too great an excess of carbon black is used, part remains in suspension and is not precipitated on the substrate particles. The excess can then be washed out.

As the amount of carbon black is increased, the lustrous pigment being modified assumes a more graphite-like gloss, without loss of the gloss itself. Only if non-coprecipitated carbon black particles are present in comparatively large amounts is the gloss impaired.

Metal salts from which hydroxides can be precipitated, include all water-soluble salts which are hydrolyzable by bases or acids. In general, alkaline hydrolysis is preferred. Especially preferred are the salts of aluminum, titanium, zirconium, chromium, iron, nickel, cobalt and/or tin. The anion can be selected as desired since it does not enter into the reaction, but merely influences the solubility of the metal salt.

Preferred aluminum salts include halides, sulfates, alkali metal aluminum sulfates and/or nitrates, which are hydrolyzable by bases, and the aluminates which are hydrolyzable by acids.

Suitable titanium, zirconium, iron, nickel or cobalt salts are, for example, sulfates, nitrates and halides, i.e., preferably chlorides. Of available chromium and tin salts, the chloride, nitrate and sulfate are preferred.

Di- and trivalent salts of iron and chromium can normally be employed, but divalent tin salts are preferred to Sn(IV) salts. However, an oxidation preferably is done after the precipitation. See published German Patent Specification No. 25 22 573 and the corresponding U.S. application Esselborn et al., Serial No. 687,458, filed May 18, 1976, the latter of which is herein incorporated by reference.

For precipitation of a BiOCl layer, a bismuth nitrate salt solution is used.

The salts are possibly kept in solution in water with a slight excess of acid or base. Concentrations of solutions employed can be chosen as desired, but generally, for reasons of expediency, are between 10 and 600 g./l.

Any base or acid which leads to hydrolysis of the salt and deposition of the corresponding metal hydroxide or of BiOCl can be used for the precipitation. Optimum concentrations and pH values can be determined by routine experiments. Once the pH has been adjusted for the precipitation, it is expediently maintained during the entire precipitation in order to produce uniform pigments.

For precipitation of aluminum salts, the pH can vary between 3 and 9. Titanium and zirconium salts are expediently hydrolyzed at pH between 1.0 and 3.0. For tin salts the optimum lies, as a rule, at pH between 1.0 and 5.0. Chromium, iron, nickel and cobalt salts can be readily precipitated as hydroxides at pH between 3.0 and 10. The precipitation of BiOCl generally takes place, according to the methods reported in the literature, at pH between 0.5 and 3.0.

Commercially readily available bases, such as NaOH, KOH, ammonia and organic bases; or dilute mineral acids, e.g., HCl or $H_2SO_4$, or organic acids, e.g., acetic or formic acid, are generally chosen. Since the bases and acids only change the pH, their nature is not critical and other bases and acids can also be employed.

Mixtures of metal oxides and hydroxides can be precipitated. If both precipitate at the same pH, the precipitation can take place concurrently. Otherwise, the precipitation must be carried out successively, after appropriate change of the pH.

Metering the metal salt solution and/or of the precipitation reagent into the pigment suspension is expediently regulated so that metal hydroxide or BiOCl being formed can deposit quantitatively on the substrate. Dispersed carbon black particles are deposited, together with metal hydroxide or BiOCl, on the substrate. In some cases, the substrate is coated with carbon black as soon as the substrate is combined with the carbon black dispersion. However, the subsequently precipitated cover layer always consists of a mixture of precipitated metal hydroxide or oxide or BiOCl and carbon black.

The process of the invention is preferably so carried out so that the substrate being coated and carbon black are both present in an aqueous suspension or dispersion. The mixture is expediently warmed, e.g., to temperatures between 40° and 100° C., preferably between 50° and 80° C. The aqueous solution of the metal salt and the precipitation agent intended for the hydrolysis are added, most preferably simultaneously. The reagents are metered so that the precipitate being formed is immediately deposited quantitatively on the substrate particles and the selected pH is maintained substantially constant during the entire precipitation. In this manner, finely divided carbon black is incorporated in the precipitate and thus firmly fixed on the substrate.

After the precipitation, the pigment obtained is worked up in the usual manner, e.g., separated from the reaction mixture, washed with water and possibly calcined at temperatures of up to 500° C., preferably at temperatures of up to 350° C. In general, calcination increases the lye and acid stability of the new pigments. However, for many proposed uses, especially in cosmetics, calcination is unnecessary since the uncalcined pigments are sufficiently stable for this purpose.

Various substances in finely divided form, i.e., of particle sizes between 0.5 and 1000 mn., can serve as substrates. Preferred, however, are substances of particle sizes between 1 and 200 mn, more preferred of between 5 and 50 mn. For example, substrates include glass, glass pearls, synthetic resin particles, talc, silica gel and aluminum oxide. Flaky particles, e.g., aluminum glitter, mica flakes, basic lead carbonate in platelet form or bismuth oxychloride or bismuth oxynitrate are preferred. Especially beautiful effects can be achieved by using glossy or lustrous pigments as substrates, most preferably lustrous pigments based on mica flakes coated with $TiO_2$ and/or $ZrO_2$.

The lustrous pigments used as substrates can be colored either by interference colors, depending upon the layer thickness of the metal oxides, or by addition of coloring metal oxides, e.g., oxides of iron, chromium, nickel and/or cobalt, or other colored materials, e.g., Berlin Blue. Such pigments are commercially available.

The proportion of carbon black in the pigments of the invention is between 0.1 and 25% by weight of the total pigment. In the different substrates, the proportion by weight of carbon black can vary very considerably. For lustrous pigments, the proportion is, in general, between 0.5 and 10% by weight of carbon black.

The proportion by weight of precipitated metal hydroxide or oxide or of BiOCl in the total pigment varies considerably with the substrate used and, also depends on the desired properties of the final pigment. In some case, a monomolecular layer suffices to fix the carbon black securely. In general, however, the covering layer in which the carbon black is incorporated is at least 0.1 nm., preferably of 0.5 to 50 nm., thick. However, considerably thicker layers can sometimes be advantageous.

The ratio of carbon black to metal hydroxide or oxide or BiOCl is also not critical since, in some cases, carbon black is already firmly held to the surface of the substrates without the precipitated covering layer so that fixation is, under certain circumstances, only necessary in the covering layer. However, for practical purposes, a weight ratio of carbon black to metal hydroxide or oxide or BiOCl of 100:1 to 1:300 is suitable. Preferred, however, in a weight ratio of 50 : 1 to 1 : 100, more preferred a weight ratio of 20 : 1 to 1 : 50.

The pigments of the invention, depending on the substrate and amount of carbon black, are either deep black pigments which can be used instead of carbon black but are characterized by the greater ease with which they can be worked up, or they are colored pigments with special color effects as when flaky or lustrous pigments have been used as substrates.

The pigments of the invention can be used in the same way as previously known pigments. They are especially suitable for fields of use where black or graphite-like color shades or color nuances, e.g., old gold or old silver, are desired. Use in cosmetics is exemplary. They are also suitable for coloring synthetic resins, lacquers and paint colors. The concentrations in compositions vary, depending on the field of use, over wide ranges, e.g., between 0.1 and 80% by weight.

Without further elaboration, it is believed that one skilled in the art can, using the preceding description, utilize the present invention ot its fullest extent. The following preferred specific embodiments are, therefore, to be construed as merely illustrative and not limitative of the remainder of the disclosure in any way whatsoever.

EXAMPLE 1

60 g. of muscovite with a particle size between 10 and 50 μ and a specific surface area of about 3 m².ial/g. (BET method) are suspended in 600 ml. of water. The suspension is mixed with a carbon black dispersion, consisting of 1.75 g. of carbon black, particle size less than 1 μ, 0.54 g. of a polyethylene glycol wetting agent and 400 ml. of water and heated to 70° C. The coating step is commenced at this temperature. For this purpose, a solution of 2.1 g. of AlCl$_3$.6H$_2$O in 120 ml. of water is slowly metered in. By simultaneous addition of 3% aqueous sodium hydroxide solution, the pH is kept constant between 6.0 and 6.5.

The suspension is stirred for about 1 hour after the addition is complete. The pigment is separated off, washed with completely demineralized water and dried at 120° C. The product contains 96.4% of mica, 2.9% of carbon black and 0.7% of Al$_2$O$_3$ and is a deep grey-black powder which, coated on a substate, has a matte, graphite-like gloss.

EXAMPLE 2

Muscovite is coated with carbon black as in Example 1. However, 16.2 g. of a commercially available carbon black dispersion (32.5% of carbon black, particle size less than 1 μ, 10% of wetting agent, 57.5% of water), diluted with 600 ml. of water, is used. The pigment thereby obtained possesses a deep black powder color and, coated on the skin, has a matte, graphite-like gloss. Analysis: 91.4% mica, 7.9% carbon black, 0.7% Al$_2$O$_3$.

EXAMPLE 3

60 g. of a lustrous pigment based on mica/TiO$_2$ with blue interference color (51% mica, 49% TiO$_2$, platelet size between 10 and 50 μ) are suspended in 600 ml. of water. To this suspension is added a suspension of 1.8 g. of carbon black (particle size < 1 μ) and 1.0 g. of a non-ionic wetting agent based on polyethylene glycol in 300 ml. of completely demineralized water. The mixture is heated to 70° C. pH is adjusted to 6.0 –6.5 by addition of aqueous sodium hydroxide or hydrochloric acid solution. For the coating, a solution of 2.1 g. of AlCl$_3$.6H$_2$O in 120 ml. of water is slowly added dropwise, with vigorous stirring. By simultaneous addition of 3% aqueous sodium hydroxide solution, the pH is maintained constant between 6.0 and 6.5. The precipitated aluminum hydroxide is thereby deposited quantitatively on the pigment particles and simultaneously fixes the carbon black particles. After about 30 minutes more, the pigment is filtered off, washed with water and dried at 130° C. It contains 49.1% of mica, 47.3% of TiO$_2$, 2.9% of carbon black, and 0.7% of Al$_2$O$_3$ and exhibits a strong dark blue powder color with a lively blue shimmer. The preparation heated at 300° C. for 40 minutes shows no change with regard to gloss and powder color.

EXAMPLE 4

60 g. of a lustrous pigment based on mica/TiO$_2$ with silvery luster (44% mica, 56% TiO$_2$, particle diameter on the average 10 μ) are suspended in 600 ml. of water and heated to 75° C. After the reaction temperature is reached, a suspension of 16.2 g. of commerically available carbon black paste (32.5% of carbon black, particle size less than 1 μ, 10% of wetting agent and 57.5% of water) in 600 ml. of water is added thereto. For the coating, a solution of 2.1 g. of AlCl$_3$.6H$_2$O in 120 ml. of water is slowly added dropwise, with vigorous stirring, and the pH is kept constant between 6.5 and 6.0 by the simultaneous addition of 3% aqueous sodium hydroxide solution. The aluminum hydroxide which precipitates thereby deposits carbon black particles quantitatively on the pigment. After about a half hour, the preparation is separated off, washed with water and dried at 120° C. The pigment exhibits a grey powder color with a silvery-metallic gloss. It contains 40.2% of mica, 51.1% of TiO$_2$, 8.0% of carbon black and 0.7% of Al$_2$O$_3$.

EXAMPLE 5

Lustrous pigments based on mica/TiO$_2$ with various interference colors are coated with carbon black analogously to Example 3. The following pigment are obtained:

| mica % | TiO$_2$ % | carbon black % | Al$_2$O$_3$ % | powder color | interference color |
|---|---|---|---|---|---|
| 69.4 | 27.0 | 2.9 | 0.7 | metallic silver | silver |
| 55.9 | 40.5 | 2.9 | 0.7 | grey with golden shimmer | old gold |
| 52.8 | 43.6 | 2.9 | 0.7 | grey with red shade | strong red |
| 51.0 | 45.4 | 2.9 | 0.7 | grey with violet shimmer | strong red-blue |
| 49.1 | 47.3 | 2.9 | 0.7 | strong dark blue | strong blue |
| 42.3 | 54.0 | 2.9 | 0.7 | dark green | dark green luminous |

EXAMPLE 6

60 g. of a lustrous pigment based on mica/TiO$_2$ with silvery luster (72% of mica, platelet size between 10 and 50 μ, 28% of TiO$_2$) are suspended in 2 l. of water. The suspension is mixed with 1.8 g. of very finely divided carbon black in the form of the commerically available carbon black paste of Example 2, adjusted to pH 2.2 with dilute hydrochloric acid and subsequently heated to b 70° C. After the reaction temperature has been reached, 6 ml. of a solution containing 150 g. of TiCl$_4$ and 30 g. of HCl per liter are added. By simultaneous addition of dilute aqueous sodium hydroxide solution (10%), the pH of the suspension is kept constant at 2.2. After the coating, the suspension is filtered off, washed with water and dried at 120° C. The product contains 69.4% of mica, 27.7% of TiO$_2$, and 2.9% of carbon black and exhibits a metallic silvery luster.

EXAMPLE 7

60 g. of the lustrous pigment described in Example 6 are suspended in 2 l. of water. The suspension is mixed with 1.8 g. of very finely divided carbon black in the form of the commercially available carbon black paste of Example 2, adjusted to pH 5.0 with dilute hydrochloric acid and subsequently heated to 70° C. After the reaction temperature is reached, a solution of 5.0 g. of CrCl$_3$.6H$_2$O in 120 ml. water is slowly added. By simultaneous addition of 3% aqueous sodium hydroxide solution, the pH of the suspension is kept constant at 5.0. The thus-obtained pigment is filtered off, washed until salt-free with water and dried at 120° C. It contains 68.3% of mica, 26.6% of TiO$_2$, 2.9% of carbon black and 2.2% of chromium oxide. It exhibits a metallic silver gloss with a greenish-grey powder color.

EXAMPLE 8

60 g. of the lustrous pigment with silvery luster described in Example 6 are suspended in water as in Example 6, mixed with carbon black and heated. To this suspension is slowly added a solution of 5.0 g. of SnCl$_2$.2H$_2$O in 120 ml. of 6% hydrochloric acid, while air is simultaneously stirred in. The pH of the suspension is kept constant at 2.2 by addition of 10% aqueous sodium hydroxide solution. The pigment is filtered off, washed with water and dried at 120° C. It displays a silvery, metallic gloss with a grey powder color and contains 66.3% of mica, 25.8% of TiO$_2$, 5.1% of SnO$_2$ and 2.8% of carbon black.

EXAMPLE 9

60 g. of muscovite with a platelet size between 10 and 50 μ are suspended in a solution of 3.77 g. of Bi(NO$_3$)$_3$.5H$_2$O, 22.4 ml. of 5N hydrochloric acid and 6.69 ml. of 5N HNO$_3$ in 260 ml. of water. The suspension is mixed with 1.9 g. of carbon black and heated to 80° C. To this suspension is added a solution of 0.25 g. of Bi(NO$_3$)$_3$.5H$_2$O, 0.54 g. of 5N HNO$_3$ and 0.66 g. of 5N HCl in 290 ml. water. After 10 minutes, a solution of 1.1 g. of NaOH in 894 ml. of water is added simultaneously with the foregoing solution. The preparation is filtered off, washed with water and dried at 110° C. It contains 93.7% of mica, 3.5% of BiOCl and 2.8% of carbon black and has a metallic-silvery luster.

EXAMPLE 10

A suspension of 25 g. of platelet-shaped BiOCl (< 10 μ) in a solution of 1.5 g. of a quaternary ammonium base wetting agent in 2 l. of 0.1N hydrochloric acid is adjusted to pH 6.8 by addition of dilute ammonia solution. To this mixture is added 0.6 g. of very finely dispersed carbon black in the form of a commercially available carbon black paste of Example 6. The mixture is heated to 70° C. Then, at pH of 6.0 to 6.5, a solution of 2.1 g. of AlCl$_3$.6H$_2$O in 120 ml. of water is slowly dropped in and the pH value is kept constant by the simultaneous addition of 3% aqueous sodium hydroxide solution. The thus-coated product is freed from salts by repeated decanting and washing with distilled water and further worked up as an aqueous suspension. With a content of 96.0% of BiOCl, 1.7% of Al$_2$O$_3$ and 2.3% of carbon black, the pigment exhibits a metallic-silvery luster with pale grey powder color.

EXAMPLE 11

Analogously to Example 4, a mica flake pigment which contains Berlin Blue (mica 68.6%, TiO$_2$ 25.9%, Berlin Blue 5.5%) is coated with carbon black, concurrently with precipitation of Al$_2$O$_3$. The pale blue, lustrous glossy pigment has, after coating and the usual work up, a strong blue interference color.

Three different types are prepared using different amounts of carbon black:

| type | carbon black | Al$_2$O$_3$ % |
| --- | --- | --- |
| a | 0.8 | 0.7 |
| b | 1.6 | 0.7 |
| c | 2.4 | 0.7 |

With increasing content of carbon black the color of the products changes from a strong greyish blue to a strong bluish black.

EXAMPLE 12

Mica flakes with a particle size between about 5 and 20 μ are coated as in Example 4. The pigment obtained contains 9% of carbon black and 0.7% of Al$_2$O$_3$ and displays a silky silvery gloss.

EXAMPLE 13

Mica flakes with a particle size between 10 and 50 μ are coated as in Example 4. The pigment obtained contains 0.6% of carbon black and 1.6% of Al$_2$O$_3$ and displays a silvery gloss.

EXAMPLE 14

Analogously to Example 11, two different substrates are coated with different amounts of carbon black:
Type A: mica flakes of 10 to 50 μ, coated with titanium dioxide and iron oxide, containing 53% mica, 2% TiO$_2$, 45% Fe$_2$O$_3$.
Type B: mica flakes of 10 to 50 μ, coated with titanium dioxide and chromium oxide, containing 45% mica, 45% TiO$_2$, 10% Cr$_2$O$_3$.

In each case, the proportion of Al$_2$O$_3$ is 0.7% in the finished pigment, and the amounts of carbon black are 0.8, 1.6 and 2.4%.

Pigments of Type A are a strong, radiant red-brown and the pigments of Type B a strong, shimmering blue-green.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and, without departing from the spirit and scope thereof, can make various changes and modifications of the invention to adapt it to various usages and conditions.

What is claimed is:

1. In a particulate pigment comprising a substrate coated with a pigmentaceous coating which includes an amount of carbon black of between 0.1 and 25% by weight of the pigment, the improvement wherein the carbon black is embedded in a precipitated layer on the substrate of a pigmentaceous metal hydroxide or metal oxide or of bismuth oxychloride.

2. The pigment of claim 1, wherein carbon black particles are below 1 mn. in size.

3. The pigment of claim 1, wherein the precipitated layer is aluminum hydroxide or oxide.

4. The pigment of claim 1, wherein the substrate is flake-shaped.

5. The pigment of claim 1, wherein the substrate is mica flakes coated with TiO$_2$.

6. The pigment of claim 1, wherein the precipitated layer is bismuth oxychloride.

7. A method for the preparation of a pigment having carbon black particles on a substrate, comprising the step of:
(a) precipitating an insoluble metal hydroxide or oxide or bismuth oxychloride in an aqueous suspension of a particulate substrate and carbon black of particle size below 1 mn., thereby forming a coating on the substrate wherein the carbon black particles are embedded in the precipitated layer.

8. The method of claim 7, including a further step (b) of calcining the thus-produced pigment after separation from the reaction mixture.

9. The method of claim 7, wherein the insoluble metal hydroxide or oxide or bismuth oxychloride layer is precipitated by hydrolysis of a solution of a corresponding metal salt in the aqueous suspension.

10. The method of claim 7, wherein the aqueous suspension contains a wetting agent.

11. The method of claim 7, wherein the aqueous suspension contains 1 to 200 mg. of carbon black per gram of the particulate substrate.

12. The method of claim 7, wherein a water-soluble aluminum salt is hydrolyzed at pH between 3 and 9.

13. The method of claim 7, wherein the particulate substrate is flake-shaped.

14. The method of claim 7, wherein the characterized particulate substrate is $TiO_2$-coated mica flakes.

* * * * *